United States Patent [19]

Hawkins

[11] Patent Number: 4,554,005

[45] Date of Patent: Nov. 19, 1985

[54] TRIAZONE FERTILIZER AND METHOD OF MAKING

[75] Inventor: Edwin F. Hawkins, Baton Rouge, La.

[73] Assignee: Arcadian Corporation, Parsippany, N.J.

[21] Appl. No.: 644,975

[22] Filed: Aug. 28, 1984

[51] Int. Cl.$^4$ .............................................. C05C 9/00
[52] U.S. Cl. ............................................ 71/30; 71/1; 71/11; 71/27; 71/64.1
[58] Field of Search ................. 71/1, 11, 27, 28–30, 71/64.1

[56] References Cited

U.S. PATENT DOCUMENTS

| | | | |
|---|---|---|---|
| 2,641,584 | 6/1952 | Martone, Jr. | 260/17.3 |
| 2,826,500 | 3/1958 | Keim | 92/3 |
| 3,462,256 | 8/1969 | Justice et al. | 71/28 |
| 4,033,745 | 7/1977 | Moore | 71/28 |
| 4,145,207 | 3/1979 | Moore | 71/29 |
| 4,244,727 | 1/1981 | Moore, Jr. | 71/29 |
| 4,304,588 | 12/1981 | Moore, Jr. | 71/28 |

*Primary Examiner*—Ferris H. Lander
*Attorney, Agent, or Firm*—William T. Hough

[57] ABSTRACT

In a preferred embodiment, a triazone mixture contains triazone present in an amount of at-least about 30% calculated on a dry weight basis of 100% solids, methylene diurea in an amount less than about 2%, monomethylolurea in an amount less than about 3%, and total methylene diurea and monomethylolurea taken-together being less than about 3%, and hexamethylenetetramine in an amount less than about 0.5%, in water solution, of which on a dry weight basis the ratio of triazone to methylene diurea is at-least about 13 and the ratio of triazone to urea is greater than about 0.5, of which typically about 80% of the triazone present is of the emperical formula $C_3M_7N_3O$ in cyclic form, and a majority of remaining triazone present is of the emperical formula $C_5M_{10}N_4O_3$ in cyclic substituted-amine form, the triazone mixture being produced by a two-stage method in which urea and/or substituted urea is reacted with aldehyde(s) and ammonia and/or primary amine(s) with the urea to formaldehyde ratio ranging from preferably about 1.2 to 1.6, and with ammonia on a weight percentage of the batch being at preferably about 3.0% to about 3.5%, such that total nitrogen in solution ranges between about 16 and 31% by weight, the first stage including heating reactants within a preferred range of about at-least 91 degrees Centigrade up to about 93 degrees Centigrade while maintaining pH at about pH 8.8 to about pH 9.2 by the continual addition of strong caustic such as sodium hydroxide over a heating period ranging preferably from about 28 to about 35 minutes, and the second stage proceeding at about the same temperature devoid of further addition of a caustic permitting pH to drop during a continued heating over a period of perferably from about 40 minutes to about 50 minutes, optimum mole ratio during the process of reactants urea, formaldehyde and ammonia, for example, being about 1.6/1.0/0.28.

28 Claims, No Drawings

४,५५४,००५

TRIAZONE FERTILIZER AND METHOD OF MAKING

This invention relates to a novel liquid fertilizer and the novel method of making it.

BACKGROUND TO THE INVENTION

Prior to the present invention there has been no method which when repeated continually will produce either triazones and/or a high concentration thereof reliably and/or consistently. Also, by prior methods of making fertilizers by somewhat similar or related method(s), the resulting product or mixture of products exhibit low or poor stability, decomposing and/or converting to crystalline compounds or products that precipitate-out thereby destroying their utility for use as liquid fertilizers, solid fertilizer of the triazone or related types of insoluble (in water) nature not being capable to release nitrogen to the roots sufficiently rapidly as to be economically or commercially feasible nor practical.

Moreover, it has been found that by current technology, it is impossible to separate individual triazone compounds from mixtures thereof in water-containing reaction product mixtures thereof, and until procedures utilized by the present inventor, it has heretofore not been readily possible to ascertain exact structure(s) and formula(s) of aqueous reaction products of process(es) related to or somewhat similar to the present method. Likewise until research by the present inventor, it heretofore had not been recognized nor known what factors and/or constituents of a reaction product contribute to major instability of the water-solubility thereof, nor what factor(s) in a method of production thereof control stability and/or yield of the final product(s) thereof such as in the present inventive process resulting in high concentration of high solubility and stable products of principally triazone compound(s) of the present invention present as a water-soluble mixture.

While there is no certainty that somewhat similar or related processes have resulted in the production of any triazone products as a part of the product-mixture in water solution, nor that—if any were so produced—that the amount of triazone therein was present in any appreciable nor significant amount, nor for how long such would be present prior to decomposition thereof or prior to the overall-mixture (reaction product) becoming worthless in-so-far-as utility for liquid fertilizer because of crystallization and precipitation of constituents thereof, the closest superficially related method or process to that of the present invention appears to be the Justice et al. U.S. Pat. No. 3,462,256 issued on Aug. 19, 1969, which is directed to and claims a process utilizing different process parameters and different mole ratio-parameters for reactants, failing to recognize the presence (if any) of the triazone(s) of the present invention and the importance thereof as a liquid fertilizer and the importance of such parameters and resulting reaction product from the standpoint of each and both effectiveness as a fertilizer of liquid nature, lack of sensitivity thereto of human skin and long-term stability thereof of the present invention. The broad limits of the Justice patent include employing urea and formaldehyde reactants in urea/formaldehyde ratio of ½, preferably 1.3/1.8, utilizing ammonia at a weight percentage of 0.3 to 6 broadly, preferably 0.7 to 3, at reaction temperatures ranging from 75 degrees Centigrade to boiling broadly, preferably from 85 to 95 degrees Centigrade, at a pH ranging broadly from 8.5 to 10, preferably pH 9 to 9.8, during a heating time of reaction broadly for 30 to 180 minutes, preferably from 75 to 115 minutes. While some of the parameters overlap, there has been no recognition by Justice nor other prior art of the critical parameters of Applicant/inventor and of the combination thereof critically necessary for the obtaining of the present invention, as shall be evidenced by some of Applicant's experiments contained herein as Examples of methods that do not work.

OBJECTS OF THE INVENTION

An object of the present invention is to obtain a novel liquid fertilizer composition suitable for foliar application and sod application devoid of potential burning of foliage and/or sod.

Another object is to obtain a novel liquid fertilizer composition suitable for situations requiring slow-release nitrogen sources.

Another object is to obtain a novel composition having an elevated or high percentage of triazone composition suitable for use as a fertilizer for foliar and/or sod applications.

Another object is to obtain above-noted compositions characterized by good stability and long-term stability against crystallization(s) of components thereof and/or precipitation therefrom of components thereof immediately or during storage.

Another object is to obtain a novel triazone composition having a high triazone composition in aqueous form, that has a high level of stability against decomposition of the triazone or degradation thereof.

Another object is to obtain a novel triazone composition in aqueous solution having high concentration of particular triazone(s).

Another object is to obtain a novel method/process for producing said novel liquid fertilizer composition(s) and improved high stabilities and composition(s) having said slow-release and having the characteristics of non-burning of foliage and/or sod when applied thereto.

Another object is to obtain a novel method of fertilizing vegetation of varying types and including sod, utilizing novel compositions of this invention.

Other objects become apparent from the preceding and following disclosure.

One or more objects of the invention are obtained by the invention as set-fourth herein, and as claimed in the appended claims.

SUMMARY OF THE INVENTION

Broadly the invention may be characterized as three inter-related inventions, namely a liquid fertilizer of novel composition(s), a novel method of producing those compositions, and a novel method of foliar fertilizer application.

More particularly, broadly stated the invention includes a liquid fertilizer composition having components thereof present in particular amounts within stated ranges, including triazone composition that is substantially soluble in water sufficiently to obtain stability to a practical commercial degree, urea, water sufficient in amount to obtain and retain a solution of the triazone(s), limited minor percentages of monomethylol urea and methylene diurea, and potentially minor amounts of dimethylol urea and hexamethylene tetramine. The triazone composition is present in an amount of at-least about 30%, preferably about 36%, and in an amount in ratio to urea by weight of at-least about 0.48, preferably 0.50. The urea on a dry-weight basis is at at-least about 40%, preferably at-least 50% and monomethylolurea is normally at about 4%. On the dry-weight basis, methylene diurea may be present up to about 3%, preferably less than about 2%, and the monomethylolurea may be present up to about 6%, preferably less than about 3%, and provided total weight of methylene diurea and monomethylolurea does not exceed about 6%, preferably less than about 3% (up to 3%). The ratio of triazone(s) on a dry weight basis, to methylene diurea is at-least about 11, preferably at-least about 13. Dimethylol urea and hexamethylenetetramine may or may not be present, with dimethylolurea ranging up to about 2.75% on a weight basis of the total weight of the aquous solution, and with hexamethylenetetramine up to about 1 percent, preferably up to about 0.5% on a weight basis(dry weight), or less, normally there being no hexamethylenetetramine present. The above-stated amounts of triazone composition and its ratio to urea are critical to the utility of the total composition of fertilizer and water solution thereof as the liquid fertilizer for above-stated objects. Also, in order to have the high level of stability of the composition of fertilizer of this invention, the method must be limited critically to not more than the above-stated maximum amounts of compounds such as the monomethylol urea, dimethylol urea and methylene diurea because of their low and limited water-solubility and instability in-so-far-as tending to crystalize and/or precipitate-out. Substantially the same thing is true for hexamethylenetetramine that is likewise limited in its maximum permissible amount in the inventive composition.

In a preferred embodiment of the invention, on a weight percentage basis a major amount of the triazone composition and/or mixture are triazones having the emperical formulas $C_3H_7N_3O$ and $G_5H_{10}N_4O_3$, with cyclic formulas:

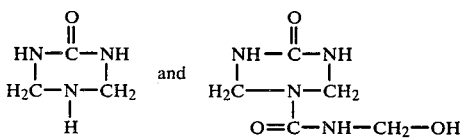

respectively, of total triazone the $C_3H_7N_3O$ on a weight basis amounting to preferably and normally at-least about 80% which is critical to obtaining preferred results as to above-stated objects.

The method of the invention has a combination of critical temperature ranges, pH ranges, reactant ratios, essential reactants, and periods of reaction, as well as being a two-phase method in-so-far-as periods of time of heating at different pH levels. In the absence of these critical limitations, it has been discovered by the present inventor to be impossible to obtain the high level of production of the triazone composition(s) of this invention, nor to obtain a liquid fertilizer containing such with as high a level of stability, particularly in conjunction with the high level or weight-percentage produced. Likewise, to obtain the non-burning triazones of this invention suitable for fertilizer foliar application as well as sod application, the critical limitations are necessary to obtain such product(s). Naturally there are broad ranges for many of these limitation within which some degree of success may be obtained, but with the maximum and high quality production being limited to the method's preferred ranges.

More particularly, for the broader aspects of the invention, the process may be described as a method for producing a water-solution fertilizer composition of substantially stable water-soluble components, of which the major novel component(s) thereof as reaction product(s) are substantially water-soluble triazone compounds, reaction components and steps being as follow.

The urea-like component must be selected from urea and/or substituted urea. A second necessary reactant is an aldehyde. A third and ammonia-source reactant must be ammonia and/or a primary amine. Finally, there must be utilized a strong caustic during the initial first step or phase of period of heating an admixture of the above-noted reactants, which strong caustic is added gradually over the period of time of the first period of heating and reaction to an extent required in order to maintain pH within the critical broad or preferred ranges. During an initial first phase of reaction, reaction of above-noted reactants is achieved by heating the admixture thereof at a temperature within a range of from about 85 degrees Centigrade to about 95 degrees Centigrade for a period of time ranging from about 25 minutes to about 60 minutes while maintaining pH within a critical range of about 8.5 up to about 9.2 by adding the strong caustic as pH tends to drop during that reaction period; during the initial first phase of reaction, the above-noted urea-like component relative to the aldehyde reactant must be maintained at-least during earlier and a dominant portion of the first phase at a reactant mole ratio of from about 1.0 to about 2.0, and likewise for ammonia on the basis of weight of ammonia, from the ammonia-source above-noted, relative to the aldehyde within a ratio range of from about 0.20 to about 0.38. On a weight-basis of ammonia, relative to weight basis of 100% of reactants, the ammonia must be reacted in an amount within a range of from about 2.2% to about 4.5%, relative to above-noted reactants on a weight basis of total water-solution weight. Following the first stage of heating and reacting, heating is continued within the same temperature range, for an additional period of about 30 minutes to about 60 minutes while permitting pH to decrease by reducing or terminating any further addition of the strong caustic, sufficiently to result in reaction product(s) of which triazone composition(s) thereby produced relative to unreacted amounts of the urea-like component on a weight basis has a ratio of at-least about 0.50.

For the above-stated method, optimal results and production critically representing the heart of the present method are as follow. During the first phase above-noted, the reaction temperature is maintained at between about 91 degrees Centigrade and about 93 degrees Centigrade, and the period of first-phase heating ranges between about 28 minutes to about 35 minutes, and the ratio of the urea-like component to the aldehyde is maintained between about 1.2 and 1.6, and the ammonia to aldehyde above-noted ratio is maintained at from about 3% to about 3.5%; and during the second, final phase of heating, the temperature of reaction is maintained at from about 90 degrees Centigrade to about 93 degrees Centigrade. In the method, for preferred reactants for optimal results critically representing the heart of the present invention, the aldehyde at least in a major porportion thereof is formaldehyde, and the urea-like component at least in a major proportion thereof is urea, and the ammonia-source in a major proportion thereof is ammonia. Good results are also obtained by sue of methylamine as a major source of ammonia, and likewise for ethylene diamine, and likewise for methylolamine and/or monoethanolamine. As the urea-like component, good results are obtained by use of thiourea, in-part or in-whole as the urea-like component. Likewise, good results are obtained by use of methyl urea, in-part or in-whole as the urea-like component. Good results is also obtained by use of acetaldehyde, in-part or in-whole as the ammonia-source.

As a third aspect of the present invention, namely the method of fertilizing vegetation, the method may be broadly described as applying to vegetation foliage, a water solution of fertilizer composition described-above for each respectively of broad and narrow (preferred) statement of limitations, and including the method of applying a major amount of substantially water-soluble triazone as the fertilizer composition, to sod, and the methods including applying each respectively or both of the triazones above-identified by the emperical formulas $C_3H_7N_3O$ and/or $C_5H_{10}N_4O_3$ and having the cyclic formulas above-stated respectively.

DETAILED DESCRIPTION

For the method of this invention, and the product(s) thereof so-produced, it has been determined that stable products cannot be made with less than about 2% (by weight of ammonia relative to about total weight of reactants) of ammonia nor more than about 4.5% ammonia, and that stable product(s) cannot be made at temperature(s) higher than about 95 degrees Centigrade, and that it is difficult to make stable products at pH values above about pH 9.2. During the developing of the critical limitations of this invention, it was determined that the pH of the reactant-mix as above-described, the reaction temperature(s), and the mole % of ammonia above-stated, each and all were much more critical to the reaction than had been initially believed. It is noted that the development of the process of the present invention, and the eventual production of the novel composition(s) thereof, resulted from the finding and recognition that the currently heretofore available liquid fertilizer concentrates, such as obtained from the practice of the process of the U.S. Pat. No. 3,462,256 to Justice et al., had unreliable shelf life as to period of time of stability prior to crystalization and/or precipitation rendering the products commercially useless and commercially impractical for foliar application, the shelf life having been observed to be variable from batch to batch produced. As a result, the process/method of the present invention was undertaken by the present inventor to produce the novel composition(s) thereof and the novel method of fertilizer application. Also, the present inventor discovered that monomethylolurea and dimethylolurea convert to dimethyleneurea on standing at ambient temperature and over a period of several weeks typically, causing solids to deposit. Moreover, it has been found that methylol compounds when reacted with urea at low temperatures merely sufficiently high to dissolve the urea over a period of about 15 minutes results in a mixture not stable, due to slow reactions at ambient temperatures to form methylolureas, such product being typically produced by the Moore patent U.S. Pat. Nos. 4,304,588 issued 12/8/81 and 4,244,727 issued 1/13/81, in which patents the product(s) are identified as monomethylol urea. Moreover, it was discovered by the inventor, that the concentration of methylene diurea is a major limiting factor to the storage stability of the product(s) of the present invention, and that the smount of methylenediurea converted from urea, shoud not exceed about 3% on a weight-basis as previously set-forth-above, in order to insure adequate storage life from a commercial practical viewpoint of utility of a liquid fertilizer product. Also, because each of monomethylol urea and dimethylol urea have been found to be unstable in solution and tend to convert to urea and methylene ureas, each and both should be kept to a minimum, as previously-stated herein.

While the inventor is not to be bound by hypothesis of the exact reactions that occur, studies and research conducted by the present inventor indicates that the triazone(s) of the present invention are formed as a result of serially consecutive reactions as follow. Urea reacts with formaldehyde, for example, to produce monomethylol urea; the monomethylol urea reacts with formaldehyde, for example, to produce dimethylol urea; and typically methyl amine reacts with the dimethylol urea to produce a methyl triazone, or an unsubstitute amine reacts with dimethylol urea to produce a hydrogen-triazone(S-tetrahydrotriazone), for example.

In experiment(s) using hexamethylenetetramine as the source of ammonia, it was found that the reaction proceeds very slowly and that an unsatisfactory product is formed which rapidly crystallizes on standing. A large percentage of the hexamethylenetetramine remained unreacted. Also, in the method, too little ammonia and/or too much formaldehyde (or other aldehyde) results in too high a percentage of unreacted urea, for the above-described method of this invention. When on a dry weight basis the ratio of triazone to methylene diurea of the final reaction product is less than about 11, yield of the triazone composition of this invention is unsatisfactorily low and poor; accordingly, the method of the invention maintains the methylene diurea in the final product at a satisfactory minimum.

The product of this invention is prepared by mixing together the required amount of urea, formaldehyde and ammonia in a aqueous solution, as a typical example. The admixture and/or solution is heated thereafter to a carefully controlled temperature, maintained at about that temperature for a specific length of time while also carefully controlled as to pH during the initial first phase of heating and reacting by a slow addition of strong alkali. Thereafter, the approximate same temperature is maintained for a second phase time period to bring about a completion of the reaction. The batch is then cooled and packaged.

The order of addition of the source(s) of urea, formaldehyde, ammonia and water are not considered to be very important provided there does not occur any prolonged periods of time of adding a final ingredient and/or provided imbalance of reactants in the required necessary amounts is not permitted for any significant period during reaction, and provided the one or more reactants are in admixture not permitted to sit in an unreacted state for any unreasonable nor prolonged period of time.

The urea may be added either as pelleted or crystal urea, as urea solution or at least partially as an already partially condensed urea-formaldehyde reaction product. The formaldehyde may be added as commercially available folmaldehyde solution or as paraformaldehyde, or partially in the form of hexamethylenetetramine or as an already partially condensed urea/formaldehyde reactant. The ammonia may be added as anhydrous, aqua ammonia or in the form of hexamethalenetetramine. The total nitrogen in the solution should be between at-least 16% and 31% or more on a weight basis of the total reaction-product solution which may be later diluted. Because, as noted-above, it had proven impossible to obtain stable liquid urea-formaldehyde fertilizer solutions when following the procedures and/or methods of prior art patents and literature, due to the limited solubility of monomethylol urea, dimethylol urea and methylene diurea and also due to the inherent instability of these material, it therefore became necessary for the present inventor to separate and to identify the components of the reaction product(s) of the present invention of liquid fertilizer solution.

High pressure liquid chromatograph was used to separate the separate reaction products prepared by the method of this invention, and prepared by related methods. Most of its components were identified by the preparation of pure compounds and running them as standards on the liquid chromatrgraph (MPLC).

One major component could not be identified by this procedure.

Paper chromatographic separation was used to concentrate this unknown component which was subsequently purified by recrystallization and identified as the unknown by further MPLC analysis.

This invention-sample was then analyzed by mass spectrophotometric, NMR, infrared and by an elemental analyzer, and determined to be an 80/20 mixture of S-tetrahydrotriazone above-identified herein as having the emperical formula $C_3H_7N_3O$ having the cyclic formula set-forth above herein, and N-hydroxymethyl formamide triazone having the emperical formula $C_5H_{10}N_4O_3$ having the cyclic formula set-forth above herein.

Suitable caustic includes any one or more of sodium hydroxide, potassium hydroxide, lithium hydroxide, sodium carbonate or other strong caustic.

The triazones within the contemplation of this invention as liquid fertilizer suitable for application to foliage and/or sod, include the relatively few triazones that are characterized by being substantially solubility in water, most being insoluble.

The liquid fertilizer product(s) of this invention were compared to certain other chemical and commercial products with regard to phytotoxicity, as follows. When averaged over all four species of turf grasses, for St. Augustine, Hybrid Bermuda, Fescue and Perennial Ryegrass, for a series of test employing different numbers of pounds per square ft. as the N rate, urea-triazone of this invention was less phytotoxic than Formolene(®) or urea by 37.5% and 44.4 percent, respectively, at the most commonly used rate of N on turf (1 lb./1,000 sq. ft.). When averaged over all species and rates, urea-triazone of this invention was 6.6% and 30% less phytotoxic than Formolene(®) and urea, respectively.

Urea-triazone of this invention is substantially safer than Formolene(®) when applied at 2.65 lbs. N/1000 sq. ft. or an undiluted application. Accordingly, the triazone(s) (urea-triazones) above-identified for this invention, are a safer turf nitrogen than the other items above-tested for comparable uses.

Likewise, for the DOT skin corrosion tests, the triazone product(s) of this invention was found to be not corrosive.

Following are typical runs, some by the method of this invention, and others outside of the limitations of the inventive method, serving in part to illustrate some of the critical limitations of the method of this invention.

EXAMPLE I (SAMPLES 1-2, 2-2, 3-2, 4-2, TESTED AT ONE POINT IN TIME)

| (Based on water soln. wt.) Components of reaction product | Percentage present by weight | | | |
|---|---|---|---|---|
| | 1-2 | 2-2 | 3-2 | 4-2 |
| Urea | 28.7 | 27.3 | 30.0 | 36.9 |
| Monomethylol urea | 1.8 | 1.8 | 6.1 | 0.9 |
| Methylene diurea | 0.8 | 1.3 | 1.1 | 1.1 |
| Dimethylol urea | 0.7 | 1.1 | 0.7 | 1.2 |
| Triazone | 18.8 | 19.6 | 12.9 | 8.2 |
| Hexamethylene tetramine | — | — | — | 2.9 |

The Sample 3-2 having a monomethylol urea (MMU) percentage of 6.1% had poor stability, the methylene diurea crystalizing-out as the monomethylol decomposed when stored for a short period on the shelf. Likewise, the sample 4-2 was unsatisfactory in its yield of triazone, at 8.2%, as a result of the final product having a high concentration of unreacted urea at 36.9% and as well there being present an unsatisfactorily large percentage of hexanmethylene tetramine at 2.9 percent, causing also instability resulting in crystalization and precipitation of components, rendering the product totally unsatisfactory for use as a liquid foliant. From the above table of which the balance of percentage for each sample is water, the percentages present on a basis of total solids are:

| | 1-2 | 2-2 | 3-2 | 4-2 |
|---|---|---|---|---|
| Urea | 56.50 | 53.33 | 59.04 | 72.00 |
| | (1-2) | (2-2) | (3-2) | (4-2) |
| Monomethylol urea (MMU) | 3.54 | 3.52 | 12.01 | 1.76 |
| Methylene diurea (MDU) | 1.57 | 2.54 | 2.17 | 2.15 |
| Dimethylol urea (DMU) | 1.37 | 2.15 | 1.41 | 2.34 |
| Triazone | 37.01 | 38.28 | 25.89 | 16.02 |
| Hexamethylenetetramine | — | — | — | 6.36 |
| Wt. ratio of Triazone/urea | 0.65 | 0.72 | 0.43 | 0.22 |
| Wt. ratio of Triazone/MDU | 23.5 | 15.1 | 11.7 | 2.6 |

Four days later, again the components percentage after that additional shelf-life, were tested, giving the following results for the above-noted samples.

| (% on basis on total water solution) | | | | | |
|---|---|---|---|---|---|
| Components of reaction pdt. | 1-2 | 2-2 | 3-2 | 4-2 | 5-1 (prior run) |
| Urea | 29.4 | 27.9 | 30.0 | 35.5 | 28.7 |
| MMU less-than | 0.1 | 0.8 | 5.3 | 0.4 | 2.3 |
| MDU | 0.9 | 1.2 | 1.2 | 1.2 | 1.2 |
| DMU | 0.5 | 0.5 | 0.8 | 1.0 | 0.6 |
| Triazone | 20.0 | 20.4 | 13.7 | 9.5 | 18.3 |
| Hexamethylenetetramine | — | — | — | 6.36 | — |

| The solids percentages by weight for this preceding table are: | | | | | |
|---|---|---|---|---|---|
| | (1-2) | (2-2) | (3-2) | (4-2) | (5-1) |
| Urea | 57.7 | 54.9 | 59.5 | 69.9 | 56.2 |
| MMU | 0.2 | 1.6 | 10.5 | 0.8 | 4.5 |
| MDU | 1.8 | 2.4 | 2.4 | 2.4 | 2.4 |
| DMU | 0.98 | 0.98 | 0.4 | 1.2 | 1.2 |
| Triazone | 39.3 | 40.2 | 26.9 | 18.7 | 35.8 |
| Hexamethylene tetramine | — | — | — | 5.7 | — |

As can be seen, the amount of hexamethylenetetramine is high and the triazone is low for experiment 4-2.

Some of the preferred triazones of this invention include S-tetrahydrotriazone, and methyl-triazone, and beta-ethanol-triazone.

For the several above-noted reaction products of the preceding Example I above-discussed and disclosed, the formulations utilized and the common (same) method applied to each were as follows:

| Formulation (wt. %) | 1-2 | 2-2 | 3-2 | 4-2 |
|---|---|---|---|---|
| Urea: | 52.3 | 52.3 | 52.3 | 48.5 |
| 25% urea-60% formaldehyde: | 31.3 | 31.3 | 31.3 | 29.0 |
| KOH Soln. (25%): | 3.0 | 3.0 | 0.3 | 0.3 |
| Aqua Ammonia (28% $NH_3$): | 10.7 | 10.7 | 10.7 | 19.7 |
| Water: | 2.7 | 2.7 | 5.4 | 2.5 |
| Mole ratio (urea/HCHO/$NH_3$): | 1.6/1/.28 | 1.6/1/.28. | 1.6/1/.28 | 1.6/1/.56 |

The procedures followed for the above-noted formulations, were as follow: 1-2: Water, urea-formaldehyde and the urea were mixed together in a reaction kettle and slowly the aqua ammonia was added while mixing. That mixture was heated to 83 degrees Centigrade and maintained at a temperature below 90 degrees Centigrade and at a pH between about pH 8.7 and pH 9 for 45 minutes, pH being maintained by the addition of the KOH. Thereafter, further heating and reaction were accomplished by maintaining the temperature of reactants at between 83 degrees Centigrade and about 90 degrees Centigrade for an additional 15 minutes. Thereafter, the reaction product was permitted to cool and was packaged.

2-2: The water, urea-formaldehyde and the urea were mixed together in a reaction kettle and pH was adjusted to pH 9.0 by addition of KOH. That mixture was then heated to 81 degrees Centigrade and pH during the heating was maintained at between 8.7 to 9.0 by continual additions KOH-$NH_3$ mixture while heating to 90 degrees Centigrade. The temperature was thereafter maintained at between 88 to 90 degrees Centigrade at a pH ranging from 8.7 to 9.0 until all of the KOH-$NH_3$ mixture had been added. Thereafter heating and reactants' temperature was maintained at between 88 and 90 degrees Centigrade for an additional 15 minutes, followed by permiting the reaction product to cool, after which it was packaged.

3-2: The water, urea-formaldehyde and urea were admixed in the reaction kettle and the pH was adjusted to 9.5 with addition of the KOH solution. The admixture/solution of reactants was then heated to about 73 degrees Centigrade at which point the urea was completely dissolved, and thereafter the reactant mixture/solution was maintained at a pH of 8.5 to 9.0 with a slow addition of aqua ammonia for approximately 10 minutes while heating to 90 degrees Centigrade. Thereafter heating and maintaining reactants at 88 to 90 degrees Centigrade were continued for an additional 30 minutes, followed by permitting the reaction product to cool and then by packaging the reaction product.

4-2: The same steps were followed as for 3-2 above, except as follows. The addition of aqua ammonia was started at about 75 degrees Centigrade and pH was maintained between 8.5 and 9.0 by a slow addition of the KOH while heating the reactants to 90 degrees Centigrade for approximately 18 minutes. Thereafter the reactants' temperature was maintained by heating, at between 88 and 90 degrees Centigrade for an additional 3 minutes.

From the above procedures, which resulted in the reaction products already discussed, it will be seen that the limitations of the method of this invention are in fact critical. It is also noted that in the 3-2 above procedure, the first-phase above-noted addition of aqua ammonia for the ten minutes, was not the equivalent of use of a strong caustic such as KOH and proved to be unsatisfactory and unacceptable for the method of the present invention. It is also noted that the pH 9.5 of procedure 3-2, was above slightly, the broad range of the method of this invention, and that the yield of was reasonably poor, as compared for example to the much higher yields of 1-2 and 2-2. The reaction product of 4-2 crystallized when permitted to stand (shelf-life) for 72 hours.

EXAMPLE II

In another series of experiments, they were designed in order to determine and illustrate the effects of various reaction conditions on the quality of the product. The first of the conditions investigated was the percentage of ammonia in the cook. This was varied from 0% to 3.0% (on the basis of weight of the water solution) with the following results.

| Run #: | 1 | 2 | 3 | 4 | 5 | 6 |
|---|---|---|---|---|---|---|
| Reactant or Product | | | | | | |
| % $NH_3$ | 0 | 1.0 | 1.5 | 2.0 | 2.5 | 3.0 |
| Unreacted urea | 31.8 | 30.6 | 34.8 | 37.7 | 34.7 | 35.8 |
| MMU* | 20.2 | 4.3 | 7.1 | 1.8 | 1.7 | Tr. (trace) |
| MDU* | 27.7 | 14.2 | 15.8 | 7.9 | 5.9 | 7.7 |
| DMU* | 18.2 | 7.1 | Tr. | Tr. Tr. | Tr. | |
| Triazone(s) (the Water soln.) | 1.3 | 43.8 | 42.3 | 52.6 | 57.7 | 56.5 |

The runs #4, 5 and 6 represent limitations within the method of the present invention.

For the above-noted runs, ratio of triazone(s) to MDU and of $NH_3$ to formaldehyde, and of triazone(s) to unreacted formaldehyde, were as follow:

| | 1 | 2 | 3 | 4 | 5 | 6 |
|---|---|---|---|---|---|---|
| triazone(s)/MDU | 0.08 | 5.9 | 5.0 | 12.5 | 18.2 | 13.7 (weight basis) |
| $NH_3$/HCHO | 0.0 | 0.09 | 0.14 | 0.18 | 0.23 | 0.28 (mole ratio) |
| triazone(s)/unreacted urea | 0.013 | 0.46 | 0.39 | 0.45 | 0.54 | 0.51 (weight basis) |

It is noted particularly that triazone(s)/MDU ratios of runs 1, 2, and 3 were all below 6, and that the resultant yields were poor for the triazone(s), the % $NH_3$ reactant for those runs being far below the required limitations of the method of this invention.

It is noted that the run #4 has insufficient ammonia reactant which results in excessive unreated urea and also in a product of poor stability, i.e. crystallization and precipitation quick, i.e. poor shelf life resulted and can be expected, even though yield of the triazone(s) was reasonably acceptable. Also these tests (runs) show that ammonia is necessary for production of stable triazone products in acceptable yields, within the range of the method of the invention, and the importance of the ratio limitations.

For the above or precedingly described method of producing a water-solution fertilizer composition of substantially stable water-soluble components as a reaction product containing substantially water-soluble triazone compounds, the above-described ammonia-source is methylamine, or at least a major portion thereof, in one embodiment. In another embodiment, the ammonia-source is monoethanolamine, or at least a major portion thereof. In another embodiment, the urea component is thiourea at least in-part. In another embodiment, the urea component is methyl urea at-least in-part. In another embodiment, the aldehyde is acetaldehyde or at least a major amount thereof. Examples of the triazones are hydrogen-triazone, methyl-triazone, and ethanol-triazone.

It is within the scope and contemplation of this invention, to make such variations and modifications and substitution of equivalents as would be apparent to a person having ordinary skill in this particular art.

I claim:

1. A liquid fertilizer composition consisting essentially of: as calculated on a dry weight basis of 100% solids, triazone composition that is substantially soluble in water, present at at-least about 30% (dry weight), urea present in an amount of at-least about 40% (dry weight) such that a ratio of amount of triazone present relative to amount of urea present is at-least about 0.48, methylene diurea up to about 3% (dry weight), monomethylolurea up to about 6% (dry weight) with total weight (dry weight) of methylene diurea and monomethylolurea up to about 6%, hexamethylenetetramine up to 2% (dry weight), and water in an amount at-least sufficient for solution of said triazone composition, said urea, said methylene diurea, said monomethylolurea and said hexamethylenetetramine being dissolved therein, and said triazone composition on a dry weight basis, relative to said methylene diurea being a ratio of at-least about 11.

2. A liquid fertilizer composition of claim 1, in which on said dry weight basis said triazone composition is present at at-least about 36% and said urea is present at at-least about 50% and with said ratio of said triazone weight to urea weight being at-least about 0.5 and said methylene diurea up to about 2% and said monomethylolurea up to about 3% with total dry weight of methylene diurea and monomethylolurea up to about 3% and hexamethylenetetramine up to about 0.5%, said ratio of triazone to methylene diurea being at-least about 13.

3. A liquid fertilizer composition of claim 2, in which said triazone composition includes in a major amount, relative to total triazone composition, a triazone having an emperical formula $C_3H_7N_3O$ and a cyclic formula of

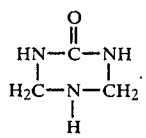

4. A liquid fertilizer composition of claim 3, in which said triazone composition includes a triazone having an emperical formula $C_5H_{10}N_4O_3$ and a cyclic formula of

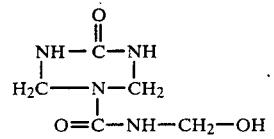

5. A liquid fertilizer composition of claim 1, in which said triazone composition includes triazones having emperical formulas $C_3H_7N_3O$ and $C_5H_{10}N_4O_3$.

6. A liquid fertilizer composition of claim 3, in which said triazone constitutes at-least about 80% of all triazones present, on a weight basis.

7. A method for producing a water-solution fertilizer composition of substantially stable water-soluble components as a reaction product containing substantially water-soluble triazone compounds, comprising: a first stage including reacting (a) a component selected from the group consisting of urea and subtituted urea, (b) an aldehyde, (c) an ammonia-source selected from the group consisting of ammonia and primary amines, and (d) a strong caustic, said reacting comprising admixing said component and said aldehyde and said ammonia source and said strong caustic at a temperature ranging from about 85 degrees Centigrade to about 95 degrees Centigrade for a period of time ranging from about 25 minutes to about 60 minutes while maintaining pH within a range of about 8.5 to about 9.2 by adding additional amounts of said caustic during said period, and said reacting further comprising maintaining a mole ratio of said component to said aldehyde of between about 1.0 and 2.0 and a mole ratio of ammonia from said ammonia-source to said aldehyde of between about 0.20 and about 0.38, and ammonia from said ammonia-source being reacted in an amount of from about 2.2 to about 4.5% of ammonia on a total water-mixture/solution weight basis of 100% of reactants of said component, said aldehyde, and said ammonia-source, and a second stage thereafter including terminating adding of said caustic permitting said pH to decrease while continuing to maintain reaction temperature at said temperature for an additional period of from about 30 minutes to about 60 minutes, such that for a final reaction product including triazone, said triazone relative to unreacted amounts of said component on a weight basis has a ratio of at-least about 1.5.

8. A method of claim 7, in which during said first stage said temperature ranges between about 91 degrees Centigrade and about 93 degrees Centigrade for said period ranging from aboout 28 minutes to about 35 minutes and maintaining said component to aldehyde mole ratio between about 1.2 and about 1.6 and maintaining said ammonia to aldehyde mole ratio at from about 0.22 to about 0.30, and said ammonia from said ammonia-source on said weight basis being reacted in an amount ranging from about 3 to about 3.5 percent, and during said second stage maintaining said temperature at from about 90 degrees Centigrade to about 93 degrees Centigrade, total nitrogen on a basis of total-weight of solution being between about 16% and about 31%.

9. A method of claim 7, in which said aldehyde comprises a major amount of formaldehyde.

10. A method of claim 7, in which said component comprises a major amount of urea.

11. A method of claim 7, in which said ammonia-source comprises a major amount of ammonia.

12. A method of claim 8, in which said aldehyde comprises formaldehyde, said component comprises urea, and said ammonia-source comprises ammonia.

13. A method of claim 8, in which said aldehyde is formaldehyde, said component is urea and said ammonia-source is ammonia.

14. A method of claim 7, in which said ammonia-source comprises a major amount of methylamine.

15. A method of claim 7, in which said ammonia-source comprises a major amount of monoethanolamine.

16. A method of claim 7, in which said component comprises a major amount of thiourea.

17. A method of claim 7, in which said component comprises a major amount of methyl urea.

18. A method of claim 7, in which said aldehyde comprises a major amount of acetaldehyde.

19. A method of fertilizing vegetation comprising applying to vegetation foliage, a fertilizer composition comprising a major amount of substantially water-soluble triazone in water solution according to claim 1.

20. A method of claim 19, in which said triazone is hydrogen-triazone (S-tetrahydrotriazone).

21. A method of claim 19, in which said triazone is methyl-triazone.

22. A method of claim 19, in which said triazone is beta-ethanol-triazone.

23. A method of claim 19, in which said water-soluble triazone is selected from the group consisting of hydrogen-triazone, methyl-triazone, and ethanol-triazone.

24. A method of fertilizing vegetation comprising applying to vegatation foliage, a water solution of a fertilizer composition consisting essentially of: as calculated on a dry weight basis of 100% solids, triazone composition that is substantially soluble in water, present at at-least about 30% (dry weight), urea present in an amount of at-least about 40% (dry weight) such that a ratio of amount of triazone present relative to amount of urea present is at-least about 0.48, methylene diurea up to about 3% (dry weight), monomethyllolurea up to about 6% (dry weight) with total weight (dry weight) of methylene diurea and monomethylol-urea up to about 6%, hexamethylenetetramine up to about 2% (dry weight), and water in an amount at-least sufficient for solution of said triazone composition, said urea, said methylene diurea, said monomethylolurea and said hexamethylenetetramine being dissolved therein, triazone composition on a dry weight basis, relative to said methylene diurea being a ratio of at-least about 11.

25. A method of fertilizing vegetation of claim 24, in which on said dry weight basis said triazone composition is present at at-least about 36% and said urea present with said ratio of said triazone composition weight to urea weight being at-least 1.5 and said methylene diurea up to about 2% and said monoethylolurea up to about 3% with total dry weight of methylene diurea and monomethylolurea up to about 3% and hexamethylenetetramine up to about 0.5%, and said ratio of triazone composition to methylene urea being at at-least about 13.

26. A method of fertilizing vegetation of claim 24, in which said triazone composition includes in a major amount, relative to total triazone composition, a triazone having an emperical formula $C_3H_7N_3O$ and a cyclic formula of

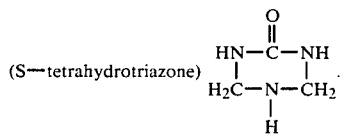

27. A method of fertilizing vegetation of claim 26, in which said triazone composition further includes a triazone having an emperical formula $C_5H_{10}N_4O_3$ and a cyclic formula of

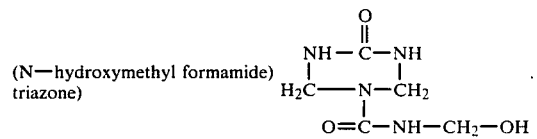

28. A method of fertilizing sod comprising applying to sod, a water solution of a fertilizer composition consisting essentially of: as calculated on a dry weight basis of 100% solids, triazone composition that is substantially soluble in water, present at at-least about 30% (dry weight), urea present in an amount of at least about 40% (dry weight) such that a ratio of amount of triazone present relative to amount of urea present is at least about 0.48, methylene diurea up to about 3% (dry weight), monomethylolurea up to about 6% (dry weight) with total weight (dry weight) of methylene diurea and monomethylol-urea up to about 6%, hexemethylenetetraamine up to 2% (dry weight), and water in an amount at least sufficient for solution of said triazone composition, said urea, said methylene diurea, said monomethylolurea and said hexamethylenetetramine being dissolved therein, triazone composition on a dry weight basis, relative to said methylene diurea being a ratio of at least about 11.

* * * * *